(12) United States Patent
Park

(10) Patent No.: US 7,070,309 B2
(45) Date of Patent: Jul. 4, 2006

(54) HEAD LAMP ASSEMBLING DEVICE OF FRONT END MODULE FOR VEHICLE

(75) Inventor: Jae-Ho Park, Seoul (KR)

(73) Assignee: Halla Climate Control Corporation, Daejeon-si (KR)

( * ) Notice: Subject to any disclaimer, the term of this patent is extended or adjusted under 35 U.S.C. 154(b) by 128 days.

(21) Appl. No.: 10/779,773

(22) Filed: Feb. 18, 2004

(65) Prior Publication Data

US 2004/0160784 A1    Aug. 19, 2004

(30) Foreign Application Priority Data

Feb. 19, 2003    (KR) .................... 10-2003-0010329

(51) Int. Cl.
  *F21V 19/02*    (2006.01)
(52) U.S. Cl. ..................... 362/523; 362/529
(58) Field of Classification Search ............... 29/281.1, 29/281.5; 362/507, 523–529, 549
  See application file for complete search history.

(56) References Cited

U.S. PATENT DOCUMENTS

| 6,205,638 | B1 * | 3/2001 | Yustick ....................... 29/464 |
| 6,805,400 | B1 * | 10/2004 | Bruderick et al. ..... 296/193.09 |
| 6,895,647 | B1 * | 5/2005 | Matsumoto et al. ....... 29/281.4 |

FOREIGN PATENT DOCUMENTS

DE    3540724 C1 * 12/1986

* cited by examiner

*Primary Examiner*—John Anthony Ward
*Assistant Examiner*—Robert May
(74) *Attorney, Agent, or Firm*—Lowe, Hauptman & Berner, LLP

(57) ABSTRACT

The present invention relates to a head lamp assembling device of a front end module of a vehicle, which is capable of locating a head lamp of the vehicle in an exact position of a fender of the vehicle. The head lamp assembling device includes: a carrier assembling stand for fixing the carrier; position adjusting means for adjusting a position of the head lamp; and movable means for moving the position adjusting means of the head lamp.

5 Claims, 6 Drawing Sheets

(a)

(b)

(a)

(b)

(a)

(b)

HEAD LAMP ASSEMBLING DEVICE OF FRONT END MODULE FOR VEHICLE

RELATED APPLICATIONS

The present application is based on, and claims priority from, Korean Application Serial Number 10-2003-0010329, filed Feb. 19, 2003, the disclosure of which is hereby incorporated by reference herein in its entirety.

BACKGROUND OF THE INVENTION

1. Field of the Invention

The present invention relates to a head lamp assembling device of a front end module of a vehicle, and more particularly, to a head lamp assembling device capable of locating a head lamp of a vehicle in an exact position of a fender of the vehicle.

2. Background of the Related Art

In general, essential parts of a vehicle are largely divided into a chassis part and a body part. The chassis part has the minimum function necessary for self-actuated traveling of the vehicle, and an engine and devices necessary for traveling are mounted on a frame of the chassis part.

The body part is to accommodate people and freights of various kinds, and includes a room, a freight compartment, an engine room, a trunk room, a fender, and so on.

The chassis part is mounted on the body part. However, recently, a radiator, head lamps, a bumper assembly, and so on, which are mounted on the front part of the vehicle, are not individually mounted on the body part but respectively mounted on a carrier for simplification of assembly and reduction of the number of assembling processes to form a front end module (FEM). The front end module is carried to an automobile manufacturing factory, and then, mounted on the front body part of a vehicle.

FIG. 1 shows a carrier and a head lamp of a head lamp assembling device according to the present invention. The head lamp and the carrier are almost the same as the prior arts in their structure, and so, will be described referring to the drawing of the present invention.

As shown in FIG. 1, the head lamp 100 is fixed to a head lamp mounting part 203 of the carrier 200. The head lamp 100 has a fixing member (not shown) formed at the rear surface thereof for mounting the head lamp 100 on the carrier 200, and the head lamp mounting part 203 of the carrier 200 also has a fixing member (not shown) for fixing the head lamp 100.

Conventionally, when the head lamp 100 is mounted on the carrier 200, the head lamp 100 is located on the head lamp mounting part 203 of the carrier 200, and the fixing members (not shown) are fixed to each other for a complete fixation.

However, the head lamp 100 of the vehicle is generally mounted on the carrier 200 in such a manner to be moved somewhat for replacement of a bulb or others, and so, the head lamp 100 may be moved during an assembling process, and there may occur errors according to the position of the fixing members (not shown) and a tightening level of tightening means such as bolts. Therefore, the conventional head lamp assembling device has a problem in that an undesired clearance is generated between the fender of the vehicle and the head lamp 100 when the carrier 200, on which the head lamp 100 is mounted, is mounted on the vehicle, and thereby, the assembling status of the vehicle becomes bad.

Furthermore, if only the position between the carrier and the head lamp is fixed, when the carrier is mounted on the vehicle, the interval between the fender of the vehicle and the head lamp becomes too wide or too narrow, and thereby, a bad assembly is generated.

SUMMARY OF THE INVENTION

Accordingly, the present invention has been made in view of the above problems, and it is an object of the present invention to provide a device and a method for assembling a head lamp, which can prevent generation of undesired interval between a fender and a head lamp when a carrier on which the head lamp is mounted is assembled to the vehicle as a fender dummy of the same shape as the fender of the vehicle is assembled in an exact position.

To achieve the object, according to the invention, there is provided a head lamp assembling device for assembling a head lamp onto a carrier comprising: a carrier assembling stand for fixing the carrier; position adjusting means for adjusting a position of the head lamp; and movable means for moving the position adjusting means of the head lamp.

It is preferable that the position adjusting means of the head lamp is a fender dummy of a shape corresponding to a fender part of the vehicle, on which the head lamp is mounted.

It is preferable that the carrier assembling stand includes a vertical frame and a horizontal frame, the vertical frame having a horizontal fixing jig for fixing and supporting the carrier in the horizontal direction, the horizontal frame having a vertical fixing jig for fixing and supporting the carrier 200 in the vertical direction.

It is preferable that the horizontal fixing jig includes: a horizontal position adjusting pin to be inserted into a horizontal position adjusting hole formed in the carrier for fixing the horizontal position of the carrier; and a drive unit for moving the horizontal position adjusting pin.

It is preferable that the vertical fixing jig includes: a vertical position adjusting pin to be inserted into a vertical position adjusting hole formed in the carrier for fixing the vertical position of the carrier; and a drive unit for moving the vertical position adjusting pin.

It is preferable that the carrier assembling stand has at least one or more measuring sensors for checking whether or not the head lamp is positioned in the exact position.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 3a is a front view of a carrier assembling stand of the head lamp assembling device according to the preferred embodiment of the present invention;

FIG. 3b is a side view of FIG. 3a;

FIG. 4a is a perspective view of a fender dummy and a fender dummy drive unit according to the preferred embodiment of the present invention;

FIG. 4b is a side view of FIG. 4a;

FIG. 6a is a front view of an assembling process of the head lamp according to a head lamp assembling method; and FIG. 6b is a side view of FIG. 6a.

DETAILED DESCRIPTION OF THE PREFERRED EMBODIMENT

Figure 1:
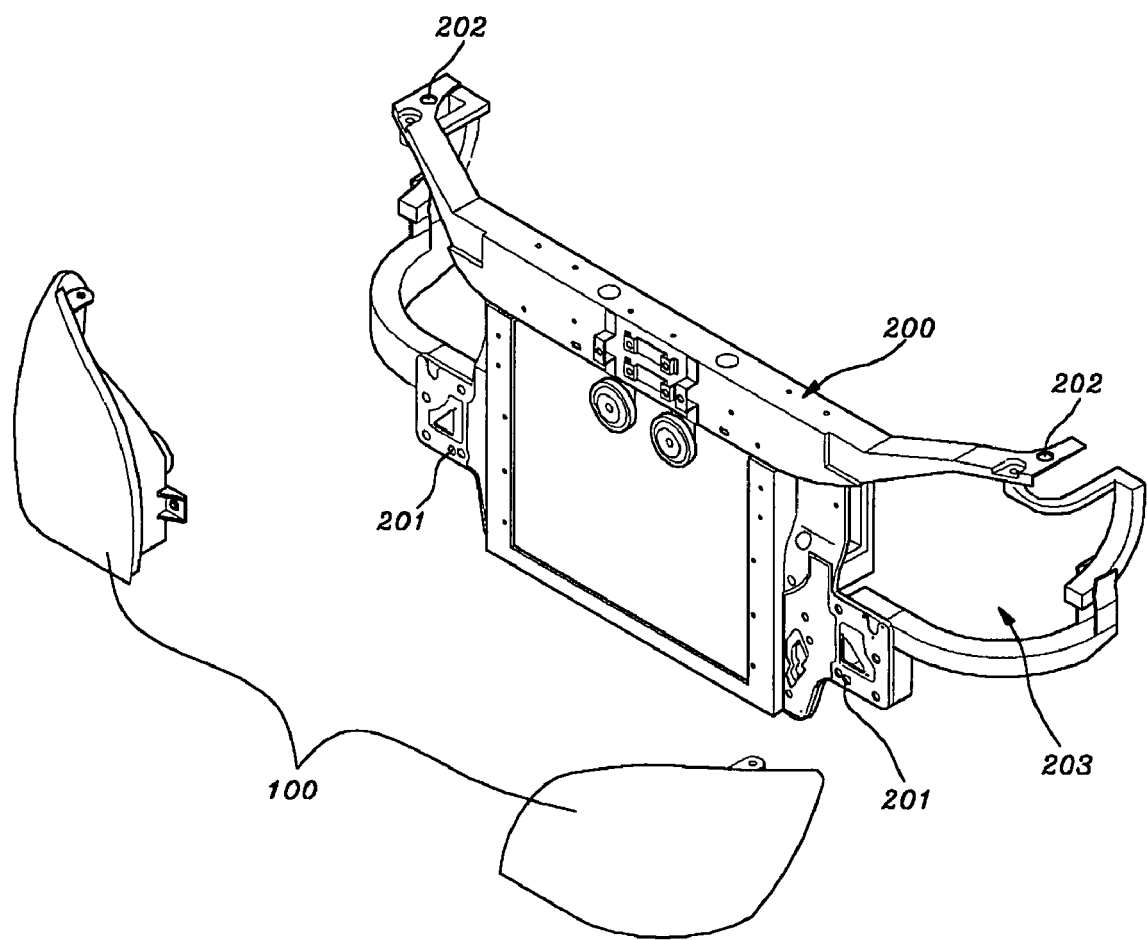
FIG. 1 is a view showing a carrier and a head lamp of a head lamp assembling device according to a preferred embodiment of the present invention.

Reference will now be made in detail to the preferred embodiments of the present invention, examples of which are illustrated in the accompanying drawings. Only one side parts of the head lamp assembling device will be described as both side parts thereof have the same structure.

A head lamp assembling device according to the present invention includes a head lamp 100, a carrier 200 on which the head lamp 100 is fixed, a carrier assembling stand 300 on which the carrier is fixed, a fender dummy 400, and an drive unit 401 for operating the fender dummy 400.

Figure 2:
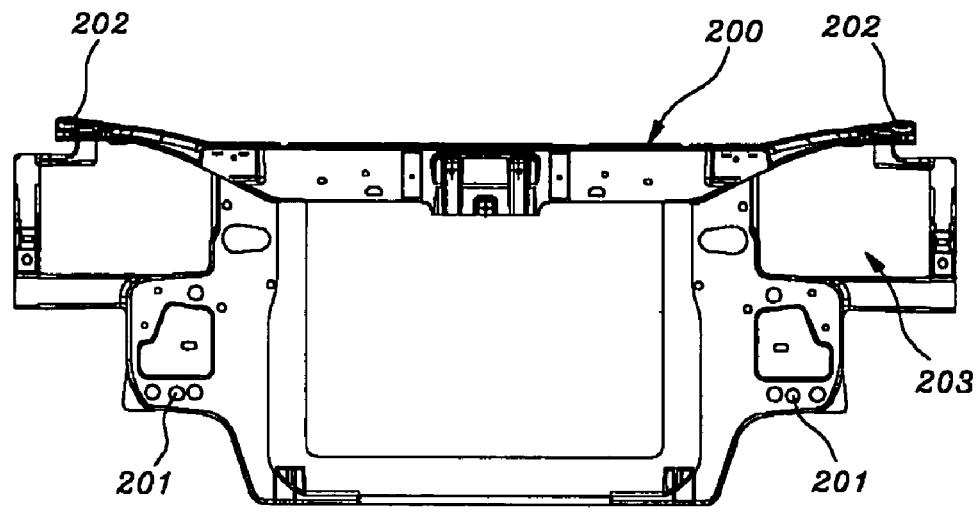
FIG. 2a is a front view of the carrier.
FIG. 2b is a plan view of the carrier.
Figure 2:
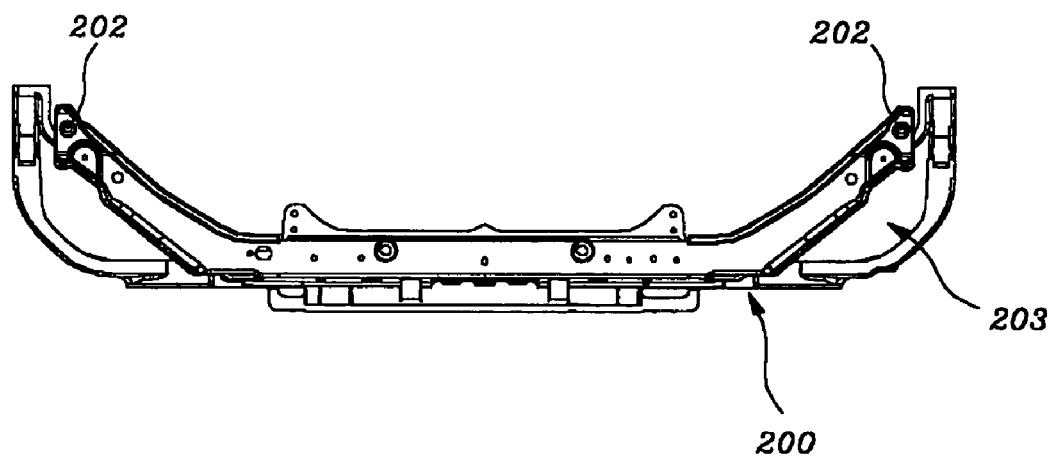

FIG. 2 shows the carrier 200, wherein FIG. 2a is a front view of the carrier 200, and FIG. 2b is a plan view.

As shown in the drawings, the head lamp 100 is fixed to a head lamp mounting part 203 of the carrier 200 by fixing means (not shown) such as bolts. The carrier 200 has horizontal and vertical position adjusting holes 201 and 202 formed in the front and upper surfaces thereof for inserting vertical and horizontal position adjusting pins 301 and 302, which will be described later.

The carrier 200 whose lower portion is fixed to a pallet (not shown) is carried onto a table 303 of the carrier assembling stand 300 by a conveyer belt.

Figure 3:
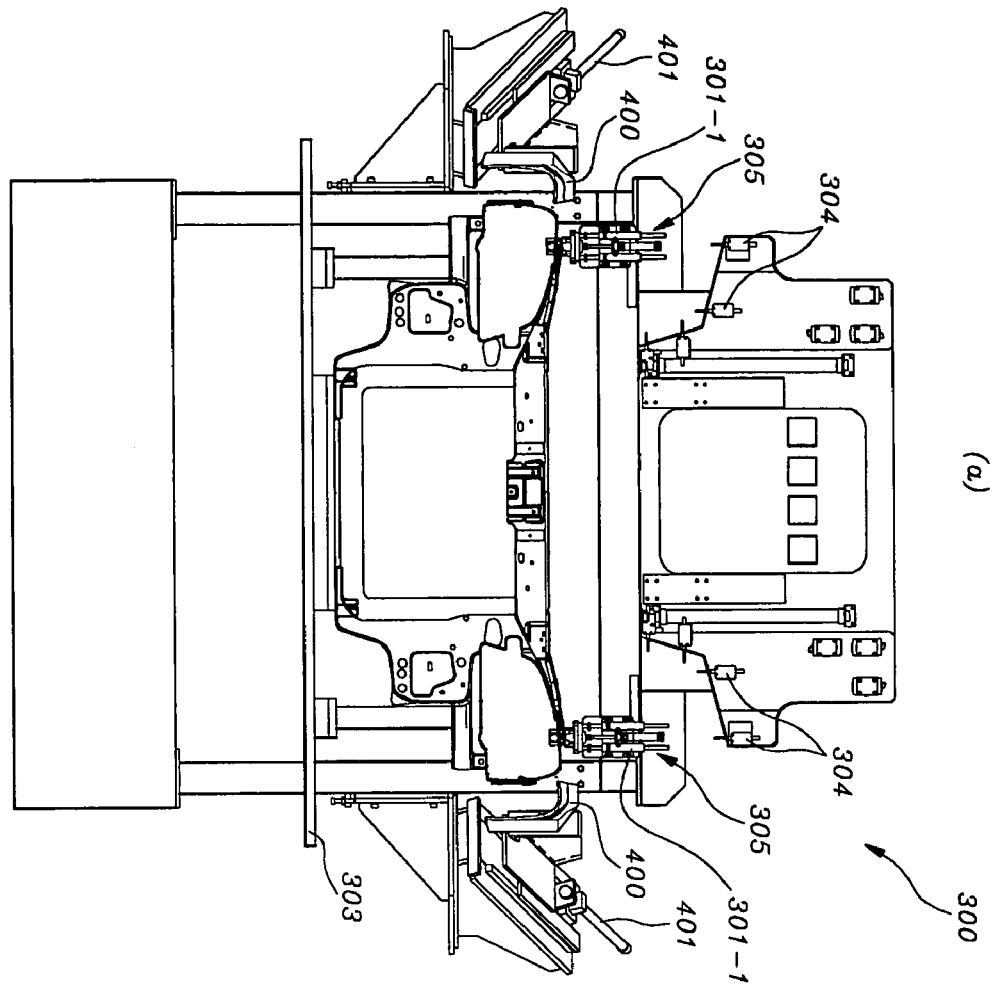
Figure 3:
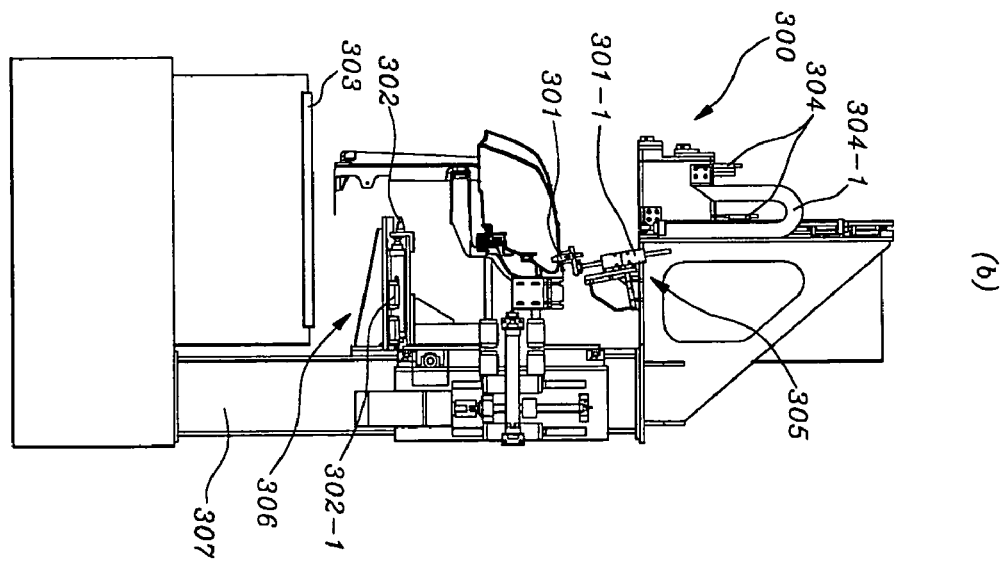

FIG. 3a is a front view of the carrier assembling stand according to the present invention, and FIG. 3b is a side view of FIG. 3a.

As shown in FIGS. 3a and 3b, the carrier assembling stand 300 includes a vertical frame 307 and a horizontal frame 308. The table 303 is mounted on the lower portion of the carrier assembling stand 300, and the pallet (not shown) is located on the table 303. Moreover, the carrier assembling stand 300 has the vertical position adjusting pin 301 mounted on the upper portion thereof, the vertical position adjusting pin 301 ascending and descending by a drive unit 301-1. The vertical position adjusting pin 301 descends when the head lamp 100 is assembled to the carrier 200, and is inserted into the vertical position adjusting hole 202 formed in the upper surface of the carrier 200 to fix the carrier 200.

Additionally, the carrier assembling stand 300 has the horizontal position adjusting pin 302 mounted on the rear surface thereof, which is horizontally movable by another drive unit 302-1 (see FIG. 3b). The horizontal position adjusting pin 302 is moved toward the carrier 100 horizontally (in the left direction in FIG. 3b) when the head lamp 100 is assembled to the carrier 200, and inserted into the horizontal position adjusting hole 201 formed in the front surface of the carrier 200 to fix the carrier 200.

Figure 4:
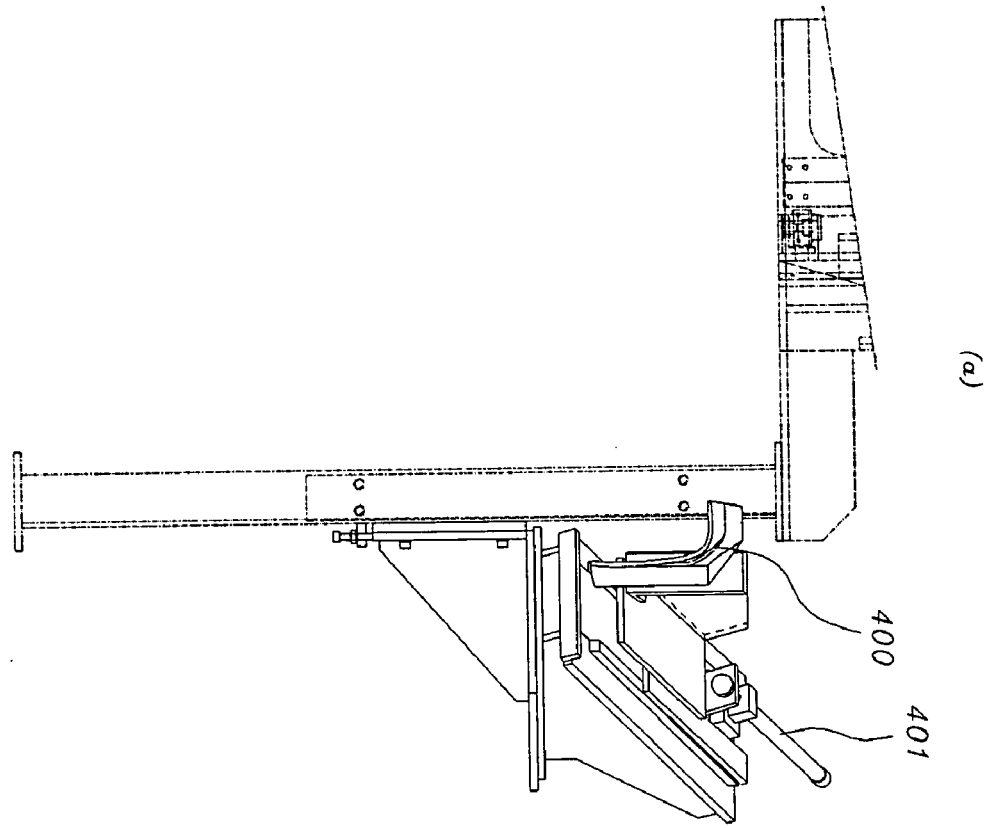
Figure 4:
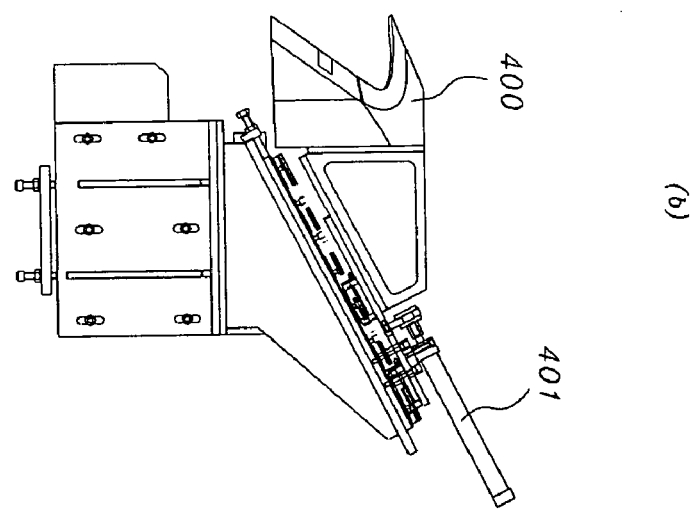

FIG. 4a is a perspective view of the fender and the fender dummy drive unit according to the present invention, and FIG. 4b is a side view of FIG. 4a.

As shown in FIGS. 4a and 4b, the fender dummy drive units 401 are mounted on both sides of the carrier assembling stand 300 (shown one of them in the drawings), and each of the fender dummies 400 is fixed to each of the fender dummy drive units 401.

The fender dummy 400 has the same shape as a fender part of the vehicle on which the carrier 200 having the head lamp 100 is assembled.

In addition, the fender dummy drive unit 401 operates the fender dummy 400 in back and forth directions, and has a position sensor and a control unit. When the head lamp 100 is assembled to the carrier 200, the fender dummy 400 is located in an exact position of the carrier 200 corresponding to a mounting position of the vehicle.

Figure 5:
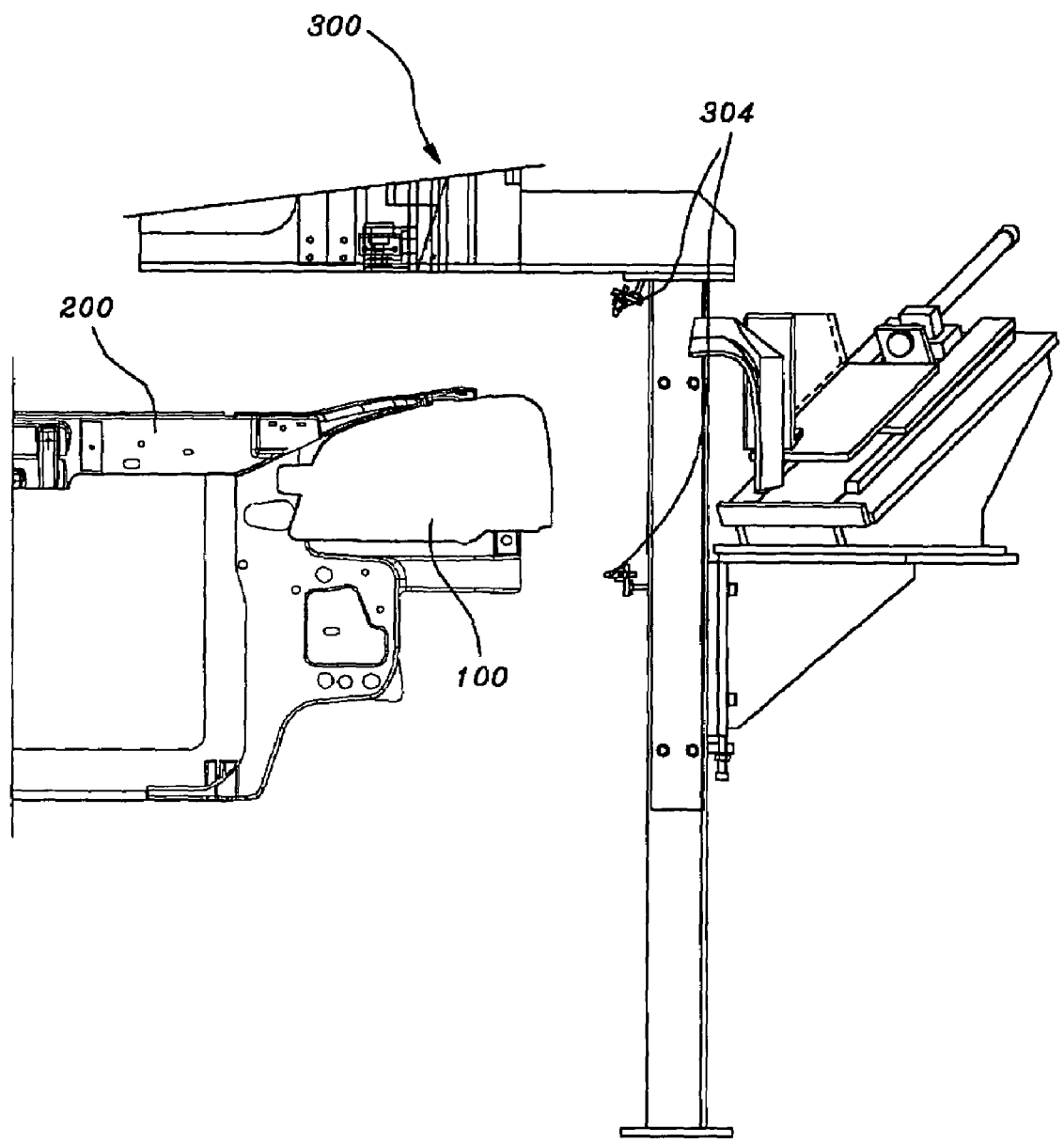
FIG. 5 is a front view of a measuring sensor of the head lamp assembling device according to the preferred embodiment of the present invention.

The head lamp assembling device has a number of measuring sensors 30. As shown in FIGS. 3a and 3b, the measuring sensors 304 are mounted on the upper portion of the carrier assembling stand 300 to ascend and descend along guide rails 304-1 by an drive unit (not shown), and as shown in FIGS. 5a and 5b, mounted on the side portions of the carrier assembling stand 300 for reciprocating motion. The measuring sensors 304 measure an assembling condition of the head lamp 100 to increase accuracy in assembly after the head lamp 100 is assembled to the carrier 200.

In FIGS. 3a and 3b, four measuring sensors 304 are mounted, but in FIGS. 5a and 5b, two measuring sensors 304 are mounted. The number of the measuring sensors 304 is not restricted to the drawings, and can be varied as occasion demands.

Figure 6:
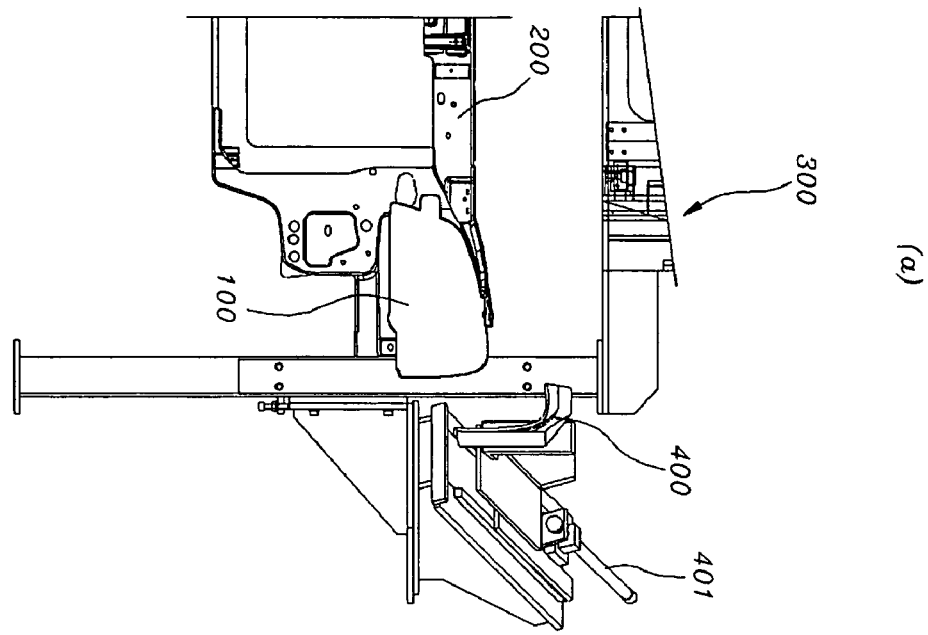
Figure 6:
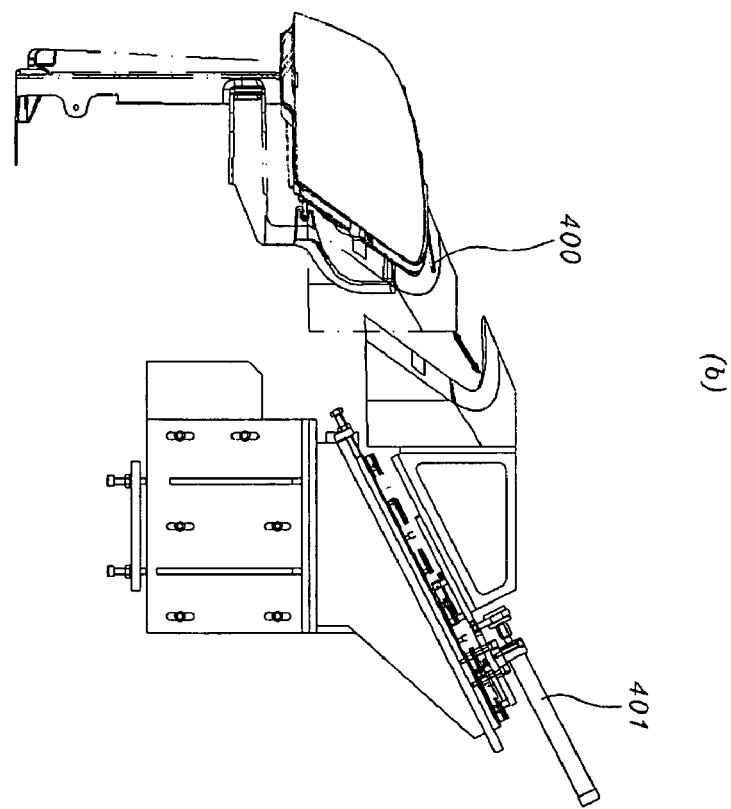

Hereinafter, referring to FIGS. 6a and 6b, an assembling method of the present invention will be described.

First, after the carrier 100 is located on the table 303 of the carrier assembling stand 300, the vertical and horizontal position adjusting pins 301 and 302 of the carrier assembling stand 300 are operated by the drive units 301-1 and 302-1 to be inserted into the horizontal and vertical position adjusting holes 201 and 202 formed in the front and upper surfaces of the carrier 200, so that the carrier 200 is fixed.

After that, the fender dummy drive unit 401 moves the fender dummy 400 forwardly to locate it at the same positions as the vehicle. At this time, the position sensor and the control unit mounted inside the drive unit are controlled so that the fender dummy 400 is located in the exact position corresponding to the mounting position of the vehicle.

The head lamp 100 is located on the head lamp mounting part 203 of the carrier 200, and closely contacts the fender dummy 400, so that the head lamp 100 is assembled to the carrier 200.

After that, the fender dummy 400 is moved backwardly by the fender dummy drive unit 401 to be removed, and then, the measuring sensors 304 measure errors by each measuring position.

If the measuring result is bad, the head lamp 100 is separated from the carrier 200, and then, the above process is repeated.

If the measuring result is good, the vertical and horizontal position adjusting pins 301 and 302 are separated from the horizontal and vertical position adjusting holes 201 and 202, and then, the carrier 200 is carried to the next assembling process.

As described above, according to the head lamp assembling device and method of the present invention, when the head lamp is mounted on the carrier in a state in which the fender dummy of the same shape as the fender part of the vehicle is located in the exact position, it can prevent generation of undesired clearance between the fender and the head lamp when the carrier on which the head lamp is mounted is assembled to the vehicle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A head lamp assembling device of a front end module for a vehicle, the device being arranged for locating head lamps on a carrier in exact positions, comprising:
   a carrier assembling stand for fixing the carrier;
   a position adjuster for adjusting a position of the head lamp, the position adjuster including a fender dummy of a shape corresponding to a fender part of the vehicle on which the head lamp is to be mounted; and
   an actuator for moving the position adjuster.

2. The head lamp assembling device according to claim 1, wherein the carrier assembling stand includes a vertical frame and a horizontal frame, the vertical frame having a horizontal fixing jig for fixing and supporting the carrier in the horizontal direction, the horizontal frame having a vertical fixing jig for fixing and supporting the carrier in the vertical direction.

3. The head lamp assembling device according to claim 2, wherein the horizontal fixing jig includes:
   a horizontal position adjusting pin to be inserted into a horizontal position adjusting hole formed in the carrier for fixing the horizontal position of the carrier; and
   a drive unit for moving the horizontal position adjusting pin.

4. The head lamp assembling device according to claim 2, wherein the vertical fixing jig includes:
   a vertical position adjusting pin to be inserted into a vertical position adjusting hole formed in the carrier for fixing the vertical position of the carrier; and
   a drive unit for moving the vertical position adjusting pin.

5. The head lamp assembling device according to claim 1, wherein the carrier assembling stand has at least one measuring sensors for checking whether or not the head lamp is correctly positioned in the exact position.

* * * * *